(12) United States Patent
Pan

(10) Patent No.: US 6,466,128 B1
(45) Date of Patent: Oct. 15, 2002

(54) VEHICLE DOOR STEP EQUIPPED WITH WARNING INDICATOR DEVICES

(76) Inventor: Miau-Shiuan Pan, No. 53, Sha Lun, Chung Sha Village, An Ting Shiang, Tainan Hsien (TW)

( * ) Notice: Subject to any disclaimer, the term of this patent is extended or adjusted under 35 U.S.C. 154(b) by 0 days.

(21) Appl. No.: 09/871,948

(22) Filed: Jun. 4, 2001

(51) Int. Cl.[7] .............................. B60Q 1/26
(52) U.S. Cl. ................ 340/468; 340/332; 362/495
(58) Field of Search ................ 340/468, 464, 340/467, 475, 479, 471, 331, 332; 362/495, 496, 505

(56) References Cited

U.S. PATENT DOCUMENTS

| | | | | |
|---|---|---|---|---|
| RE34,275 E | * | 6/1993 | Ramsey | 362/81 |
| 6,018,295 A | * | 1/2000 | Jewell et al. | 340/468 |

* cited by examiner

*Primary Examiner*—Daryl Pope
(74) *Attorney, Agent, or Firm*—Rosenberg, Klein & Lee

(57) ABSTRACT

A vehicle door step equipped with warning indicator devices comprises a number of anti-skips sticking on a door step, and signal and warning lights at respect side corners of the door step. An outer edge of the door step is arranged with warning devices which are powered by the vehicle power system. When the vehicle make turns, these signal and warning devices will indicate the vehicle's movement at a dark area, and also to show passengers and other pedestrians the presence.

6 Claims, 2 Drawing Sheets

VEHICLE DOOR STEP EQUIPPED WITH WARNING INDICATOR DEVICES

BACKGROUND OF THE INVENTION

1. Field of the Invention

This invention relates to a vehicle door step equipped with warning indicator devices, more particularly to a door step equipped with signal lights, and warning lights.

2. Description of the Related Prior Art

Most of the leisure vehicles or jeeps on the market have steps bulking out from two sides, it is convenient for passengers to get in or out of the vehicle. This design has some shortcomings:

1. The door step bulges outward from the vehicle, which may hit by passengers or others;
2. The step is not illuminated, when parking in the dark area, passengers may lose their way;
3. Most vehicles have signal lights only on the front and at two rear ends, this may cause the other vehicles driving next by to miss the signal and causes an accident.

In view of this, the inventor has invented the present invention, which corrects all of the above-mentioned shortcomings.

SUMMARY OF THE INVENTION

It is the primary object of the present invention to provide a vehicle door step equipped with warning indicator devices, which is safe both to the passengers and to the person passing by.

It is another object of the present invention to provide a vehicle door step equipped with warning indicator devices, which is convenient for passengers to step on.

It is a further object of the present invention to provide a vehicle door step equipped with warning indicator devices, which is easy to install and power safer.

DETAILED DESCRIPTION OF THE PREFERRED EMBODIMENT

Figure 1:
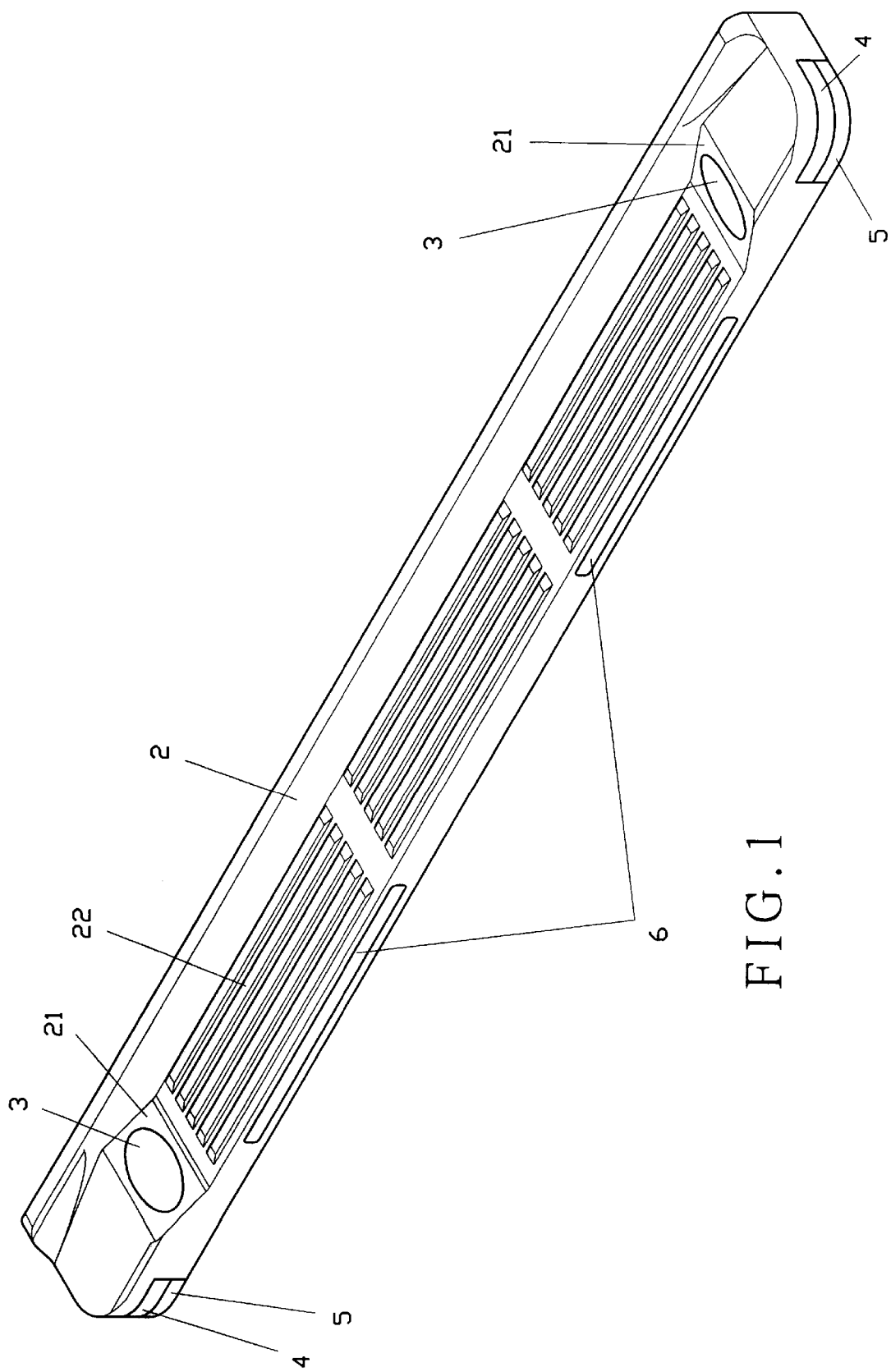
FIG. 1 is a perspective view of the present invention.
Figure 2:
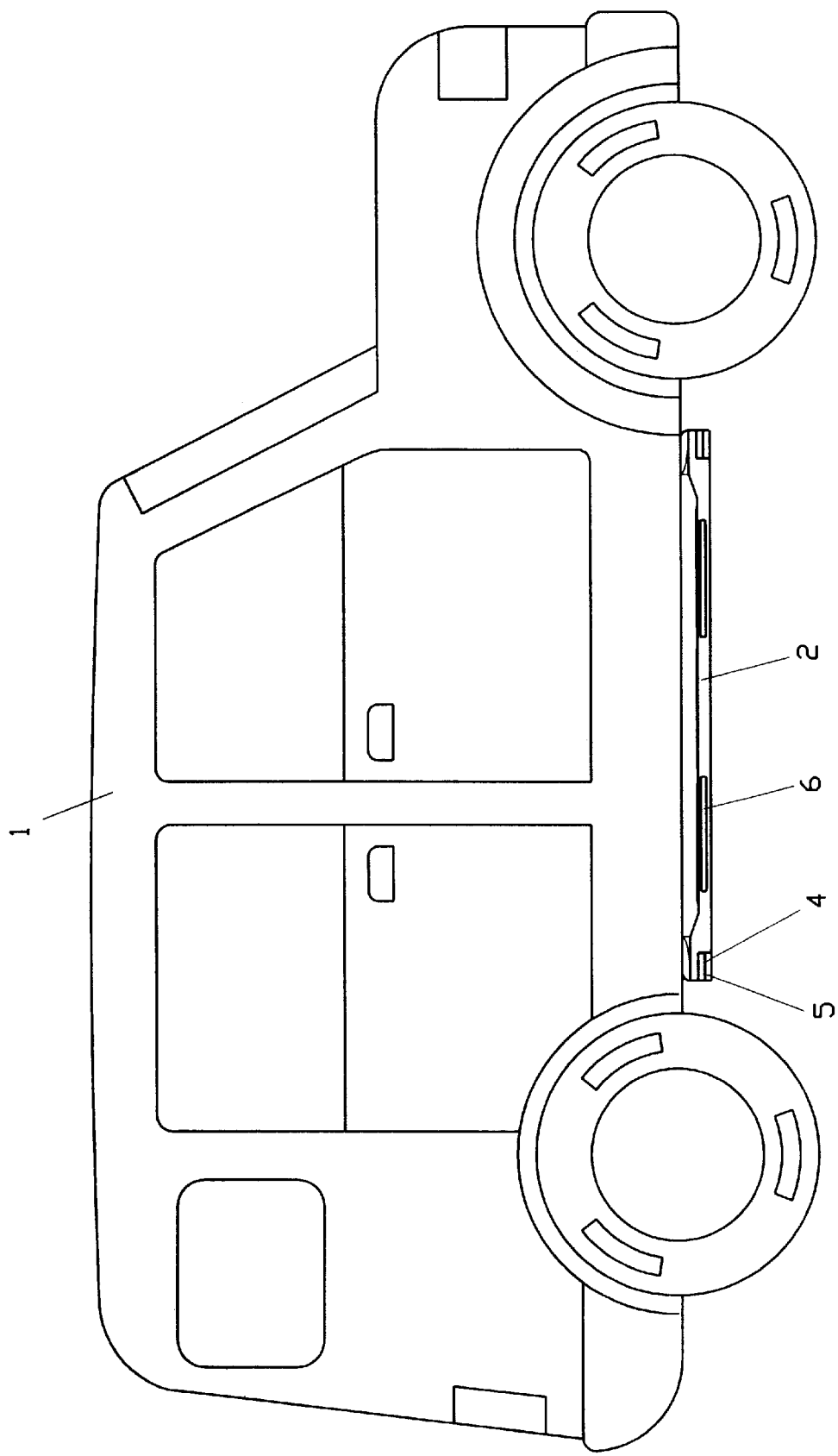
FIG. 2 is a side view of a vehicle incorporated with the present invention.

FIGS. 1 and 2 indicate a leisure vehicle 1 being equipped with a pair of door steps 2 at bottom of respective sides of the vehicle 1. Two ends and an outer edge of the door step 2 are bulged and erected while the center portion is lower, and is formed with a pair of slopes 21 between the center portion and the erections of the two ends. There are a few anti-skid strips 22 on the center portion of the door step 2. Each of the slopes 21 has an illumination device 3. Signal lights 4 and warning lights 5 are set on each outer corner of the erection edges of the door step 2. Both of the signal lights 4 and the warning lights 5 are powered by the vehicle's electricity. Further, the signal lights 4 work with the regular signal lights, and whereas the warning lights 5 may be operated independently or with interior lights of the vehicle 1, such as illuminating with a reading light and remain on so long as the reading light is on. The outer edge of the door step 2 is also installed with warning devices 6 which may also turn on and off with the warning lights 5.

When the signal lights of the vehicle 1 are turned on, the signal lights 4 on the door step 2 are also turned on, so that the other vehicles or pedestrians may notice that intention of the driver.

When driving in a dark area, the interior lights are turned on, the warning lights 5 and the warning devices 6 also light up to indicate the location of the door steps 2 and the presence of the door steps 2 and the vehicle 1. This has increased the safety of driving.

When parking in a dark area, the warning lights 5 and the warning device 6 of the vehicle 1 may be illuminated independently for pedestrians and other drivers to avoid from hitting the vehicle 1, accidentally. The lights also provide passengers a safe step to get into the vehicle.

The illumination devices 3 are linked with doors, so that when the door is open, the illumination devices 3 will be turned on, and when the door is closed, the illumination devices 3 are always turned off.

The signal lights 4 and the warning lights 5 are both at the corner of the door step 2, and the door steps 2 stick out from both sides of the vehicle 1, other drivers will have a clear view.

The warning devices 6 are made of LED, they may also be made by sticking reflection material around the door step to reflect light from the other vehicles.

I claim:

1. A safety enhanced door step system for a vehicle comprising:

(a) at least one door step for attachment adjacent a door of the vehicle, said door step having an elongate stepping surface and a side portion extending thereabout; and, (b) a plurality of energizable lighting devices coupled to said door step, each of said lighting devices being actuable responsive to the occurrence of a predetermined vehicular condition corresponding thereto, said lighting devices including:

(1) at least one illumination device disposed adjacent said stepping surface, said illumination device being operable to illuminate said stepping surface;

(2) at least one signal light coupled at least partially to said door step side portion, said signal light being correlated in actuation with a signaling light of the vehicle; and, (3) at least one warning light coupled at least partially to said door step side portion, said warning light being actuable independently of said signal light to project a warning light outwardly from said door step.

2. The safety enhanced door step system as recited in claim 1 wherein said illumination device is actuable responsive to a door of the vehicle being in an open state.

3. The safety enhanced door step system as recited in claim 2 comprising at least a pair of said illumination devices disposed respectively at opposed portions of said door step adjacent said stepping surface.

4. The safety enhanced door step system as recited in claim 1 wherein said warning light is actuable responsive to energization of an interior cabin light of the vehicle.

5. The safety enhanced door step system as recited in claim 4 comprising at least a pair of said warning lights disposed at distal corner-defining ends of said door step side portion.

6. The safety enhanced door step system as recited in claim 1 wherein at least one of said lighting devices includes a light emitting diode.

* * * * *